US008168289B2

(12) United States Patent
Seth et al.

(10) Patent No.: US 8,168,289 B2
(45) Date of Patent: May 1, 2012

(54) COMPONENT HAVING WEAR COATING APPLIED BY COLD SPRAY PROCESS

(75) Inventors: Brij B. Seth, Maitland, FL (US); Gregg P. Wagner, Apopka, FL (US)

(73) Assignee: Siemens Energy, Inc., Orlando, FL (US)

( * ) Notice: Subject to any disclaimer, the term of this patent is extended or adjusted under 35 U.S.C. 154(b) by 1598 days.

(21) Appl. No.: 10/836,560

(22) Filed: Apr. 30, 2004

(65) Prior Publication Data

US 2004/0202885 A1 Oct. 14, 2004

Related U.S. Application Data

(62) Division of application No. 10/210,719, filed on Aug. 1, 2002, now Pat. No. 6,780,458.

(60) Provisional application No. 60/309,451, filed on Aug. 1, 2001, provisional application No. 60/336,825, filed on Dec. 5, 2001.

(51) Int. Cl.
*B32B 7/02* (2006.01)

(52) U.S. Cl. ........ 428/212; 428/543; 428/564; 428/191; 428/469; 428/217; 428/325; 428/457; 407/119; 51/309

(58) Field of Classification Search .................. 428/543, 428/564, 937, 191, 192, 203, 421.1, 419.7, 428/207, 469, 217, 325, 472, 457, 698; 427/191, 427/192, 203, 421.1, 419.7, 418.7; 407/704, 407/119; 51/907, 309

See application file for complete search history.

(56) References Cited

U.S. PATENT DOCUMENTS 3,754,976 A 8/1973 Babecki
4,340,698 A * 7/1982 De Jongh et al. ............. 525/438

(Continued)

FOREIGN PATENT DOCUMENTS

EP 0 718 420 A1 12/1995

(Continued)

OTHER PUBLICATIONS

Smith, M.F., et al. Cold Spray Direct Fabrication—High Rate, Solid State, Material Consolidation. To be published in the Proc. of the Fall 1998 Meeting of the Materials Research Society, Boston, MA, Nov. 30-Dec. 4, 1998, 12 pages.

(Continued)

*Primary Examiner* — David Sample
*Assistant Examiner* — Lawrence Ferguson

(57) ABSTRACT

A component (10) including a substrate material (12) and a wear alloy coating (14) applied to the substrate by a cold spray process. Particles of the wear alloy coating material (16) are directed toward a target surface (18) of the substrate at a velocity sufficiently high for the particles to deform and to adhere to the target surface. The size and/or composition of the particles may be varied during the cold spray process to produce a coating with a varying property across the depth of the coating. Particles of the wear alloy material may be applied by cold spraying along with particles of a second material such as a lubricant or a ceramic material. For Group 5 hard facing materials, the size and distribution of the embedded carbide nodules may be controlled by controlling the selection of the carbide particles being sprayed. The cold spray process permits a wear alloy coating to be applied proximate a brazed joint or over a directionally stabilized or single crystal material without degrading the underlying material.

20 Claims, 2 Drawing Sheets

U.S. PATENT DOCUMENTS

| | | | | | |
|---|---|---|---|---|---|
| 4,372,404 | A | * | 2/1983 | Drake | 175/374 |
| 4,382,811 | A | | 5/1983 | Lüscher | |
| 4,416,421 | A | | 11/1983 | Browning | |
| 4,430,360 | A | | 2/1984 | Bill | |
| 4,552,784 | A | | 11/1985 | Chu | |
| 4,576,874 | A | | 3/1986 | Spengler | |
| 4,610,698 | A | | 9/1986 | Eaton | |
| 4,639,399 | A | | 1/1987 | Aprigliano | |
| 4,714,622 | A | | 12/1987 | Omori et al. | |
| 4,753,094 | A | | 6/1988 | Spears | |
| 4,854,196 | A | | 8/1989 | Mehan | |
| 4,880,614 | A | | 11/1989 | Strangman | |
| 5,024,884 | A | | 6/1991 | Otfinoski | |
| 5,059,095 | A | | 10/1991 | Kushner | |
| 5,076,897 | A | | 12/1991 | Wride et al. | |
| 5,180,285 | A | | 1/1993 | Lau | |
| 5,210,944 | A | | 5/1993 | Monson | |
| 5,302,414 | A | | 4/1994 | Alkhimov | |
| 5,495,979 | A | * | 3/1996 | Sastri et al. | 228/124.1 |
| 5,607,561 | A | | 3/1997 | Gruver et al. | |
| 5,660,320 | A | | 8/1997 | Hoffmuller et al. | |
| 5,665,217 | A | | 9/1997 | Gruver et al. | |
| 5,702,574 | A | | 12/1997 | Foster | |
| 5,704,759 | A | | 1/1998 | Draskovich | |
| 5,763,106 | A | * | 6/1998 | Blanchard et al. | 428/570 |
| 5,912,087 | A | | 6/1999 | Jackson | |
| 5,928,977 | A | * | 7/1999 | Magnin et al. | 501/87 |
| 5,932,356 | A | | 8/1999 | Sileo et al. | |
| 5,952,110 | A | | 9/1999 | Schell | |
| 5,997,248 | A | | 12/1999 | Ghasripoor | |
| 6,015,586 | A | | 1/2000 | Omori | |
| 6,060,174 | A | | 5/2000 | Sabol | |
| 6,102,656 | A | | 8/2000 | Nissley | |
| 6,106,959 | A | | 8/2000 | Vance | |
| 6,194,086 | B1 | | 2/2001 | Nenov | |
| 6,251,494 | B1 | | 6/2001 | Schreiber | |
| 6,365,222 | B1 | | 4/2002 | Wagner | |
| 6,469,278 | B1 | * | 10/2002 | Boyce | 219/146.1 |
| 6,528,123 | B1 | * | 3/2003 | Cadden et al. | 427/404 |

FOREIGN PATENT DOCUMENTS

| | | |
|---|---|---|
| JP | 8-333671 | 12/1996 |
| RU | 2038411 | 6/1995 |

OTHER PUBLICATIONS

Gilmore,D.L., et al. Particle Velocity and Deposition Efficiency in the Cold Spray Process. Journal of Thermal Spray Technology vol. 8(4) Dec. 1999, pp. 576-582.

Kreye, H., et al. Cold Spraying—A Study of Process and Coating Characteristics, pp. 419-422.

Dykhuizen, R.C., et al. Gas Dynamic Principles of Cold Spray. Journal of Thermal Spray Technology vol. 7(2) Jun. 1998, pp. 205-212.

Dykhuizen, R.C., et al. Impact of High Velocity Cold Spray Particles. Journal of Thermal Spray Technology vol. 8(4) Dec. 1999, pp. 559-564.

Smith, Mark F. Overview of Cold Spray. Sandia National Laboratories, 20 pages.

Smith, Mark F., et al. Thermal Spray at Sandia. Sandia National Laboratories MFS LMP 80428, 13 pages.

Sandia's Approach to Cold Spray Research. Sandia National Laboratories,15 pages.

"Metals Handbook", Ninth Edition, vol. 3, pp. 563-567 and 589-594 The American Society of Metals.

The Cold Gas-Dynamic Spraying Method—A New Method for Coatings Deposition Promises a New Generation of Technologies, by Anatolii N. Papyrin, Nov. 1998.

* cited by examiner

COMPONENT HAVING WEAR COATING APPLIED BY COLD SPRAY PROCESS

This application is a divisional of U.S. application Ser. No. 10/210,719, filed Aug. 1, 2002 now U.S. Pat. No. 6,780,458. This application also claims benefit of the Aug. 1, 2001, filing date of U.S. provisional patent application No. 60/309,451; and further the Dec. 5, 2001, filing date of U.S. provisional patent application 60/336,825; and further the Jan. 30, 2001, filing date of U.S. patent application Ser. No. 09/774,550; and further the Dec. 5, 2000, filing date of U.S. patent application Ser. No. 09/729,844.

FIELD OF THE INVENTION

This invention relates generally to the field of materials technology, and more specifically to a wear alloy coating applied by a cold spray process.

BACKGROUND OF THE INVENTION

It is well known to apply a wear alloy coating to a substrate material to improve its resistance to abrasion, galling, hammering, moisture erosion, solid particle erosion or other types of wear. "Hard facing" is defined in Materials Handbook, Ninth Edition, Volume 3, published by The American Society of Metals, on pages 563-567, as "the process of applying, by welding, plasma spraying or flame plating, a layer, edge or point of wear-resistant metal onto a metal part to increase its resistance to abrasion, erosion, galling, hammering or other form of wear." Nonferrous alloys are also used for wear applications, both as wrought parts and as coatings, as discussed on pages 589-594 of the same Materials Handbook. The term "wear alloy" as used herein is meant to include both the hard facing materials discussed on pages 563-567 and the nonferrous alloys discussed on pages 589-594 of the Material Handbook.

Wear alloys are frequently used in applications where systematic lubrication against abrasion is not feasible or is inadequate to give a desired service life to a component. New parts may be provided with a wear alloy coating in selected areas and worn parts may be refaced multiple times before replacement of the entire part becomes necessary, thereby reducing the lifetime cost of the part.

Hard facing materials are classified in Materials Handbook into five major groups defined primarily according to total alloy content (elements other than iron). Generally, as the group number increases from Group 1 to Group 5, the alloy content, wear resistance and cost will all increase. Groups 1, 2 and 3 hard facing materials are ferrous materials generally contain a total alloy content of less than 50%. Group 4 materials contain from 50-100% alloy content, typically nickel-based and cobalt-based alloys with alloying elements of nickel, chrome, cobalt, boron and tungsten. Group 5 materials consist of hard granules of carbide distributed in a metal matrix. The carbide may be tungsten carbide, titanium carbide, chromium carbide or tantalum carbide. The metal matrix may be a ductile material such as iron, cobalt or nickel. Carbide based wear resistant materials are often used in applications of severe low stress abrasion where cutting edge retention is needed. Low stress wear resistance is an important component of a carbide material's performance. Some carbide systems, such as those with chromium carbide, also afford significant high temperature oxidation/corrosion resistance while retaining excellent wear resistance properties.

Nonferrous wear alloys may be wrought cobalt-base alloys (such as commercial brands sold under the names of Stellite 6B, Stellite 6K, Haynes 25 and Tribaloy T-400), beryllium-copper alloys (for example C17200) and certain aluminum bronzes (C60800, C61300 and C61400 soft ductile alloys and very hard proprietary die alloys).

Welding, brazing and flame spraying techniques have been used to apply wear alloy coatings. Brazed materials are limited in their potential uses by the melting temperature of the braze alloy. A welded or flame sprayed wear alloy coating may be subject to cracking upon its application due to the shrinkage cracking of these relatively brittle coating materials. Furthermore, the heat input during the application of a wear alloy coating may cause warping of a relatively thin substrate member such as a turbine blade. The heat input from the application of a wear alloy coating may melt or otherwise metallurgical degrade properties of an underlying single crystal or directionally stabilized substrate material or a proximate brazed joint.

Dilution is the interalloying of the wear alloy and the base metal, and it is usually expressed as the percentage of base metal in the deposited wear alloy. A dilution of 10% means that the deposit contains 10% base metal and 90% wear alloy. As dilution increases, the hardness, wear resistance and other desirable properties of the deposit are reduced. The amount of dilution may vary depending upon the deposition process being used and the thickness of the coating. One known technique used to control the amount of dilution it to deposit a buffer layer between the base metal and the wear alloy.

For applications requiring a thick layer of hard face coating material, several coating layers may be used. However, highly alloyed deposits are likely to spall if applied to a thickness of more than 6 mm (¼ inch) as a result of interfaces created within the coating by splat boundaries between sprayed layers or brittle phases between welded layers.

BRIEF DESCRIPTION OF THE DRAWINGS

These and other advantages of the invention will be more apparent from the following description in view of the drawings that show.

DETAILED DESCRIPTION OF THE INVENTION

U.S. Pat. No. 5,302,414 dated Apr. 12, 1994, incorporated by reference herein, describes a cold gas-dynamic spraying process for applying a coating, also referred to herein as a cold spray process. That patent describes a process and apparatus for accelerating solid particles having a size from about 1-50 microns to supersonic speeds in the range of 300-1,200 meters per second and directing the particles against a target surface. When the particles strike the target surface, the kinetic energy of the particles is transformed into plastic deformation of the particles, and a bond is formed between the particles and the target surface. This process forms a dense coating with little or no thermal effect on the underlying target surface.

The applicants have found that a cold spray process may be used advantageously to apply and to control the material properties of a wear alloy coating. Furthermore, a cold spray process may be used to apply wear alloy materials in applications where traditional brazed or weld-applied coatings are not practical. A wear alloy coating may be applied to a component surface by a cold spray coating process to increase the surface resistance to wear, erosion, cavitation, and severe low stress abrasion while retaining cutting edge retention and good high temperature properties, high toughness, excellent corrosion and oxidation resistance, as well as excellent resistance to thermal shock and impact. Particles of the coating material are directed at a high speed against the surface to be coated. The particles deform upon impact with the surface, causing them to adhere to each other and to the target surface.

Figure 1:
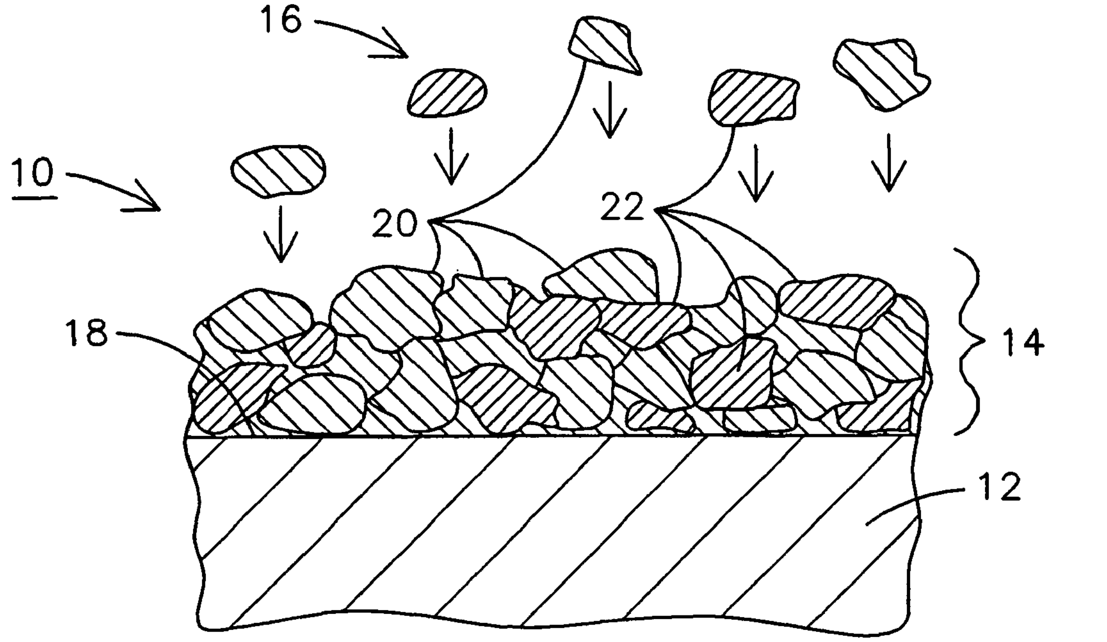
FIG. 1 is a partial cross-sectional view of a component having a wear alloy coating applied by a cold spray process wherein particles of carbides of a predetermined size are intermixed with particles of a metal matrix material.

FIG. 1 illustrates a partial cross-sectional view of a magnified section of a component 10 having a substrate material 12 coated with a layer 14 of a wear alloy material. Layer 14 is formed by cold spraying a mix of particles 16 toward a target surface 18 of the component 10 at a velocity sufficiently high to cause the particles 16 to deform and to adhere to the target surface 18. As will be described more fully below, the particles 16 may all be of a similar size and composition, or the particles may be selected to have different size ranges and/or different compositions. In the embodiment of FIG. 1, the layer 14 includes particles of a first material 20 and particles of a second material 22. The size of each type of particle is selected to fall within a predetermined size range, and the relative quantities of the two types are particles are controlled during the preparation of the particle mixture or during the cold spray application process. In one embodiment, the first material 20 may be a cobalt, iron or nickel matrix material and the second material 22 may be tungsten carbide (WC). Together, these particles adhere to surface 18 to form a layer 14 of a Group 5 hard facing material. In another embodiment, only a single composition of material may be used; i.e. first material 20 and second material 22 are the same material, for example a Group 1, 2 or 3 ferrous hard facing material or a Group 4 nickel-base or cobalt-base hard facing material alloy or a nonferrous wear alloy such as powders of a wrought cobalt-base material, aluminum bronze material or copper-beryllium material. Because the size and relative quantities of the powder materials may be selected for use in the cold spray application process, and because cold spray process parameters such as velocity and angle of impact may be controlled, a wear alloy coating having predetermined performance characteristics may be designed and manufactured with a high degree of control.

Figure 2:
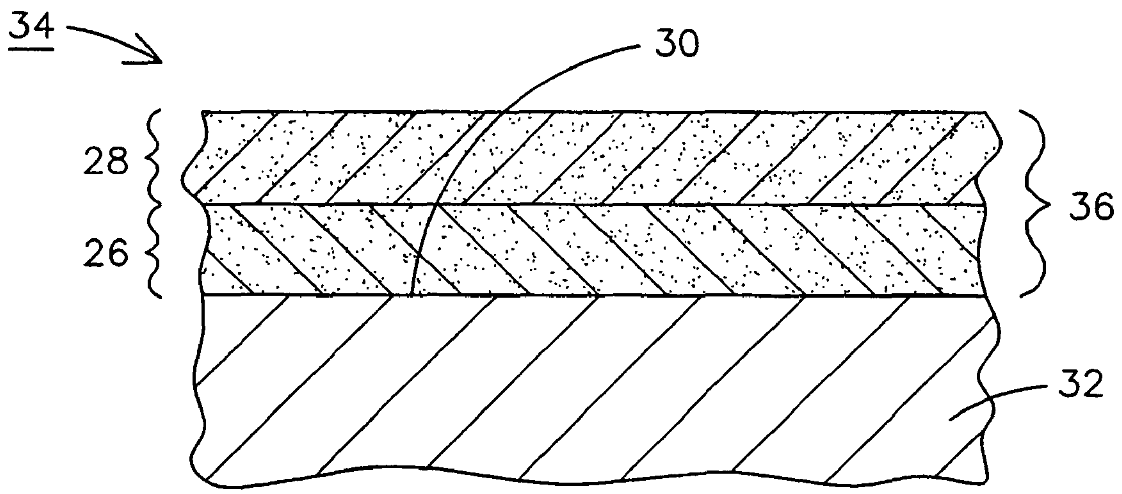
FIG. 2 is a partial cross-sectional view of a component having a wear alloy coating applied by a cold spray process to form two distinct layers on a target substrate surface.

FIG. 2 illustrates another aspect of the invention wherein a plurality of layers 26, 28 is applied to a target surface 30 of a substrate material 32 of a component 34 by a cold spray process to form a wear alloy coating layer 36. The layers 26, 28 are formed by changing the composition, size and/or mix of the particles and/or changing the cold spraying parameters used to form the respective layers 26, 28. The resulting coating 36 will exhibit a varying property across its depth. Such a coating 36 may be useful in applications where a change in chemical or mechanical properties is desired as the coating 36 wears away. For example the concentration of cobalt included in the coating 36 may vary across the depth of the coating, such as having a greater concentration of cobalt in layer 26 than in layer 28. FIG. 2 is illustrated as having two discrete layers 26, 28, although additional discrete layers may be formed.

Figure 3:
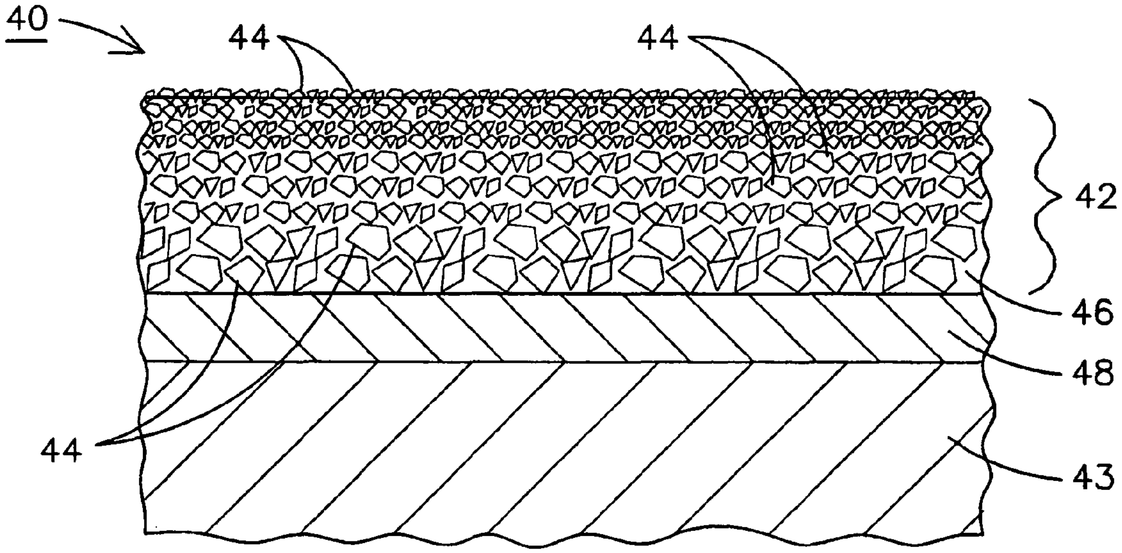
FIG. 3 is a partial cross-sectional view of a component having a wear alloy coating applied by a cold spray process to have a gradual change in the size of carbide particles across a depth of the coating.

FIG. 3 illustrates another embodiment of a component 40 having a graduated layer 42 of a wear alloy material applied to a substrate 43 by a cold spray process, wherein there is a gradual change in a property across the depth of the wear alloy layer 42. FIG. 3 illustrates a layer 42 having a change in the size of carbide particles 44 across the depth of a matrix material 46. In other embodiments, the concentration of carbide particles 44 in relation to the concentration of matrix material 46 particles may vary across depth. Such variation can be achieved by changing the particle mix 16 during the cold spraying process as the coating thickness grows. In other embodiments, the particle size may remain constant while the chemical composition of the particles is varied across the depth of the coating, or both the particle size and chemical composition are varied across depth. In still other embodiments, the size, composition and/or concentration may range from a value A near the top of the layer to a value B near the bottom of the layer, or oppositely from the value B near the top of the layer to the value A near the bottom of the layer.

FIG. 3 illustrates a layer of material 48 disposed between the substrate material 43 and the wear alloy material layer 42. Such an intermediate layer 48 may be used as a buffering layer to accommodate adverse effects of differences in coefficient of thermal expansion between the wear alloy layer 42 and the base metal 43. The intermediate layer 48 may be, for example, an alloy of MCrAlY or MCrAlRe, where M is nickel, cobalt, iron or a mixture thereof. Particles of the same material may be used to form the intermediate layer 48 and the matrix material 46.

As illustrated in FIGS. 1 and 2, the wear alloy material layer 14, 36 may be applied directly to the substrate material 12, 32 using a cold spray process with little or no dilution of the wear alloy material 14, 36. The melting of the underlying substrate material 12, 32 and mixing with the melted coating material causes dilution. With a cold spray process there is little or no melting of the substrate 12, 32, and thus a wear alloy coating 14, 36 can be achieved having properties that are improved over the same coating material applied by a prior art thermal process.

A cold spraying process will produce a wear alloy material coating that approaches 100% density and includes no linear interfaces. As a result, there is a reduced chance of spalling when highly alloyed coatings such as Group 4 or Group 5 hard facing materials are applied by cold spraying to a depth exceeding ¼ inch than there would be when such coatings are applied by a prior art thermal technique. This makes it possible to produce a component 10 having a high alloy coating 14 with a depth exceeding 0.25 inch, such as 0.375 or 0.5 inch.

Because a cold spray process imparts only a small amount of heat to the underlying substrate material 12, it is possible to apply a wear alloy coating using a cold spray process in applications where it would not be possible using prior art thermal techniques. In one embodiment, a wear alloy coating material in particle form 16 is directed toward a target surface 18 of a substrate material 12 that is either a directionally solidified material or a single crystal metal material. The velocity of the particles is sufficiently high to cause the particles to deform and to adhere to the target surface 18 without recrystallization of the directionally solidified or single crystal metal substrate material 12. In another embodiment, the component 10 may have a brazed joint, and the particles are directed to a target surface 18 proximate the brazed joint at a velocity sufficiently high to cause the particles 16 to deform and to adhere mechanically to the target surface 18 without metallurgical degrading the properties of the brazed joint.

Furthermore, no heat-treating of the component is required after the coating deposition, unlike prior art thermal processes.

In one embodiment, a mixture of particles 16 is prepared to include 75-96 wt. % carbide particles 26 and the remainder particles 22 of cobalt, iron, nickel and/or alloys thereof. The particles are manufactured by processes known in the art such as spray drying or melt spinning processes. The size range of the particles may be controlled to be within any desired size range, for example from 2 microns to 50 microns. Because carbides have a significantly higher hardness than the matrix material, the carbide particles 26 will experience a reduced amount of deformation compared to the matrix material particles 22 upon impact with the target surface 18. The carbide particles 26 will adhere to the target surface 18 as they embed themselves upon impact and as they are surrounded by the deforming matrix material particles 26. As a result, the size and quantity of the carbide particles 26 contained in a Group 5 hard face material coating 14 may be controlled more accurately by using a cold spray process than with prior art thermal techniques wherein the size of the carbide particles can vary significantly as a function of the rate of cooling/solidification of the material. A preferred size range and/or quantity of carbide particles may be predetermined for a particular application in order to optimize the performance of the coating under particular erosion wear or oxidation/corrosion conditions. When applied by a cold spray process, the average size of the carbide granules 22 distributed in a matrix 20 of metal such as nickel, cobalt or iron may be selectively less than or greater than the average size range that would be obtained by prior art casting techniques. Moreover, the size and distribution of carbide particles 22 may be made purposefully uniform (FIG. 1) or non-uniform (FIG. 3) throughout the coating if desired. Standard material wear tests may be used to determine an optimal particle size range and distribution for a particular application.

Figure 4:
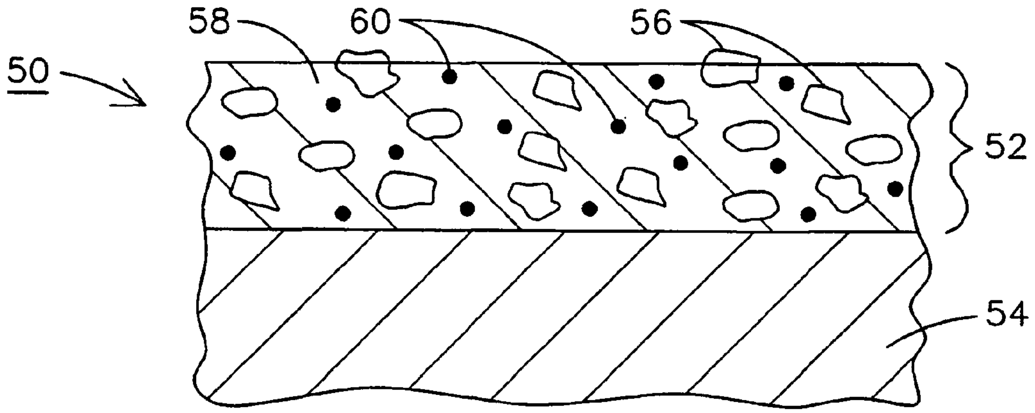
FIG. 4 is a partial cross-sectional view of a component having a wear alloy coating applied by a cold spray process to have both carbide particles and graphite particles surrounding by a metal matrix.

FIG. 4 illustrates a component 50 having a layer of a wear alloy material 52 deposited on a substrate material 54 by a cold spray process. The layer of hard facing material 52 includes a plurality of carbide particles 56 distributed within a metal matrix material 58. The layer of wear alloy material 52 further includes particles of a lubricating material 60 added to promote lubrication of the wear alloy coating 52. The lubricating material may be graphite, or molybdenum disulfide, for example. Particles of a lubricant material may be cold sprayed together with particles of any type of wear alloy coating material to reduce friction when the coating is contacted during operation of the underlying part. The quantity and size of the lubricant particles may be selected to achieve a desired degree of lubricity. Furthermore, varying the concentration of lubricant particles 60 as the coating layer is deposited may vary the degree of lubricity across the depth of the coating 52.

Other combinations of particle types and sizes may be used to produce a wear alloy coating having particularly desired properties. Particles of a wear alloy material may be combined with particles of one or a plurality of other types of materials. In a further embodiment, particles 20 of a wear alloy material may be combined with particles 22 of a ceramic material to form a coating layer 14 having improved temperature capabilities resulting from the presence of the ceramic material. Alternatively, second material particles 22 may be a superalloy material such as nickel based superalloy IN738. A superalloy material may be used exclusively or in part as the matrix material.

The surface roughness of coating layer 14 may be affected by controlling the cold spray process parameters used to apply the coating 14. In some applications it may be desired to impart a predetermined degree of roughness to the surface of a component 10 in order to promote turbulent air flow over the surface, such as to promote mixing and heat transfer across the surface. Generally a higher impact velocity of the particles 16 will result in a smoother coating surface. In one application the component 10 is a part of a gas turbine engine exposed to hot combustion gases, and the surface roughness of coating 14 impacts the heat transfer between the hot gases and the coating 14 and underlying substrate material 12.

The process and coating described herein may be used in any application, and is especially useful for valves, steam turbine blades and vanes, combustion turbine z-notch shrouds, erosion shields and combustor basket spring clips. This process may further be used for mining applications, piston rings, cams, bushings, valves, thrust washers, cutting tool applications and other manufacturing applications for severe abrasion and wear conditions. For space applications, a thin coating of moly-disulfide material may be applied by cold spray to prevent localized cold welding under the low temperature, high local stress conditions of a spacecraft application. The coatings described herein may be applied in a factory or a field environment.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A component comprising:

a substrate; and a coating material comprising particles of a wear alloy material and a second material different than the wear alloy material, wherein the particles are deformed and adhered to the substrate by a cold spray process, wherein a size range of the wear alloy material particles varies across a depth of the coating material to provide the coating material with a varying property across its depth.

2. The component of claim 1, wherein the wear alloy material particles comprise carbide particles and the size range of the carbide particles varies across the depth of the coating material.

3. The component of claim 1, wherein the coating material further comprises particles of a lubricant material applied by the cold spray process.

4. The component of claim 1, wherein the second material comprises a ceramic material.

5. A component comprising:

a substrate; and a coating material comprising particles of a wear alloy material and a second material different than the wear alloy material, wherein the particles are deformed and adhered to the substrate by a cold spray process, wherein a concentration of the wear alloy material relative to the second material varies across a depth of the coating material to provide the coating material with a varying property across its depth.

6. The component of claim 5, wherein the particles of wear alloy material comprise carbide particles.

7. The component of claim 5, wherein the coating material further comprises particles of a lubricant material applied by the cold spray process.

8. The component of claim 5, wherein the second material comprises a ceramic material.

9. A component comprising:

a substrate comprising a surface comprising single crystal material; and a coating material comprising particles of a wear alloy material applied to the substrate surface by a cold spray process at a velocity sufficiently high to cause the particles to adhere to the surface without causing recrystallization of the single crystal material.

10. The component of claim 9, wherein the particles of wear alloy material comprise carbide particles.

11. The component of claim 9, wherein the coating material further comprises particles of a lubricant material applied to the substrate surface by the cold spray process.

12. The component of claim 9, wherein the coating material further comprises particles of a ceramic material applied to the substrate surface by the cold spray process.

13. A component comprising:

a substrate comprising a surface comprising directionally solidified material; and a coating material comprising particles of a wear alloy material applied to the substrate surface by a cold spray process at a velocity sufficiently high to cause the particles to adhere to the surface without causing recrystallization of the directionally solidified material.

14. The component of claim 13, wherein the particles of wear alloy material comprise carbide particles.

15. The component of claim 13, wherein the coating material further comprises particles of a lubricant material applied to the substrate surface by the cold spray process.

16. The component of claim 13, wherein the coating material further comprises particles of a ceramic material applied to the substrate surface by the cold spray process.

17. A component comprising:

a substrate comprising a surface comprising a brazed joint; and a coating material comprising particles of a wear alloy material applied to the substrate surface proximate the brazed joint by a cold spray process at a velocity sufficiently high to cause the particles to adhere to the surface without degrading metallurgical properties of the brazed joint.

18. The component of claim 17, wherein the particles of wear alloy material comprise carbide particles.

19. The component of claim 17, wherein the coating material further comprises particles of a lubricant material applied to the substrate surface by the cold spray process.

20. The component of claim 17, wherein the coating material further comprises particles of a ceramic material applied to the substrate surface by the cold spray process.

* * * * *